US008542728B2

(12) United States Patent
Lien

(10) Patent No.: US 8,542,728 B2
(45) Date of Patent: Sep. 24, 2013

(54) INVERSE QUANTIZATION PROCESSING METHOD AND DEVICE

(75) Inventor: Chu-Feng Lien, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 541 days.

(21) Appl. No.: 12/786,788

(22) Filed: May 25, 2010

(65) Prior Publication Data

US 2010/0296577 A1 Nov. 25, 2010

(30) Foreign Application Priority Data

May 25, 2009 (TW) ................................ 98117361 A

(51) Int. Cl.
*H04N 7/12* (2006.01)
*H04N 7/50* (2006.01)

(52) U.S. Cl.
USPC ................. 375/240; 375/E7.139; 375/E7.155

(58) Field of Classification Search
None
See application file for complete search history.

(56) References Cited

U.S. PATENT DOCUMENTS

| | | | | |
|---|---|---|---|---|
| 5,263,088 | A * | 11/1993 | Hazu et al. | 704/229 |
| 5,576,765 | A * | 11/1996 | Cheney et al. | 375/240.02 |
| 8,243,797 | B2 * | 8/2012 | Lin et al. | 375/240.05 |
| 8,255,445 | B2 * | 8/2012 | Cham et al. | 708/401 |
| 8,279,922 | B2 * | 10/2012 | Schoenblum | 375/240.03 |
| 2007/0263728 | A1 * | 11/2007 | Yanagihara et al. | 375/240.24 |

OTHER PUBLICATIONS

Cock et al, "Requantization Transcoding in Pixel and Frequency Domain for Intra 16x16 in H.264/AVC", Advances in Multimedia Information Processing, Lecture Notes in Computer Science 4179, Springer-Verlag Berlin Heidelberg, 2006, pp. 533-544.*

Youn et al, Fast Video Transcoding Architectures for Networked Multimedia Applications, IEEE Int'l. Symp. on Circuits and Systems 2000 (ISCAS 2000), May 28-31, 2000, Geneva, Switzerland.*

* cited by examiner

*Primary Examiner* — Gims Philippe
*Assistant Examiner* — Reza Aghevli
(74) *Attorney, Agent, or Firm* — WPAT, PC; Justin King

(57) ABSTRACT

An inverse quantization processing method and associated device is provided comprising a determining unit, a bit reduction unit, a frequency/time-domain conversion unit, and a bit addition unit which collectively perform an inverse quantization processing method by receiving a plurality of quantized frequency-domain data, performing a bit reduction on a current quantized frequency domain data according to an adjusting factor, generating a bit-reduced quantized frequency-domain data when an accumulated count value of a plurality of valid bit numbers of the plurality of quantized frequency-domain data greater than a first threshold reaches a second threshold, performing a frequency/time domain conversion on the bit-reduced quantized frequency-domain data to obtain a bit-reduced time-domain PCM data, and performing a bit addition on the bit-reduced time-domain PCM data according to the adjusting factor, so as to obtain a time-domain PCM data.

20 Claims, 5 Drawing Sheets

INVERSE QUANTIZATION PROCESSING METHOD AND DEVICE

CROSS REFERENCE TO RELATED PATENT APPLICATION

This patent application is based on Taiwan, R.O.C. patent application No. 098117361 filed on May 25, 2009.

FIELD OF THE INVENTION

The present invention relates to an inverse quantization processing method and a device thereof, and more particularly, to an inverse quantization processing method applied to a decoder, and a device thereof.

BACKGROUND OF THE INVENTION

An analog/digital conversion is a process for converting an analog signal to a digital signal. Currently the pulse code modulation (PCM) technology developed by the Bell Laboratory in 1939 is widely applied in the analog/digital conversion. The PCM conversion has three major steps including sampling, quantization and encoding.

A sampling cycle in seconds is denoted as T. Inverse of the sampling cycle, which is the number of sampling cycles per second, is called sampling frequency denoted as fs in hertz (Hz). Once the sampling frequency is higher, audio quality gets better. Generally, when the sampling frequency is 8000 Hz, the audio quality is quite satisfactory. To obtain a CD-quality, the sampling frequency is 44100 Hz.

A sampled pulse signal at the sampling time point should be an amplitude equal to an original amplitude. The amplitude can be any possible value. The amplitude is quantized into a digital level signal. The quantization process obtains an approximation of a sampled signal. Each approximation result is called quantization level, and intervals between the quantization levels are determined according to a code length. Since the code length is expressed in bits to represent an audio data, a resolution of the amplitude is determined by the code length. When the code length is one byte, the resolution is 255. When the code length is two bytes, the resolution reaches 65535 so that the audio quality becomes much better. However, a good digital signal processor (DSP) and more memory space is required to store the voice data represented in a larger code length.

A differential pulse-code modulation (DPCM) is introduced to reduce data amount. The DPCM records a difference between a current value and a previous value. Therefore, compared to PCM, the data amount produced by the DPCM is in average reduced to 25% of the original data amount. An adaptive differential pulse-code modulation (ADPCM) is a variation of the DPCM. The ADPCM implements a scale factor to compress the data amount, so as to increase transmission bandwidth. The ADPCM is described in the ITU-T standard G.726 in detail.

During a cross-platform encoding and decoding process, a mismatch between a code length and a decoding capability occurs. That is, when the code length used at an encoder end is not supported at a decoder end, a problem is incurred. For example, referring to FIG. 1, a digital television (DTV) 1 is connected to a Universal Serial Bus (USB) disk 11 via a USB connector 10 to further access and play multimedia files 110 stored in the USB disk 11. An audio compression data such as an MP3 data in the ISO-MPEG Audio Layer-3 format has a code length of 32 bits. When a decoder 12 of the DTV 1 supports only 24 bits, quantization values generated from an inverse quantization in the frequency domain over-flow or saturate, such that a PCM signal in the time domain is distorted and audio quality is deteriorated. Therefore, one main object of the present invention is to overcome the disadvantage as mentioned above.

SUMMARY OF THE INVENTION

An inverse quantization processing method applied to a decoder is provided according to one aspect of the present invention. The method comprises receiving a plurality of quantized frequency-domain data; performing a bit reduction on a current quantized frequency domain data according to an adjusting factor to obtain a bit-reduced quantized frequency-domain data when an accumulated count value of valid bit numbers of the plurality of quantized frequency-domain data greater than a first threshold reaches a second threshold; performing a frequency/time domain conversion on the bit-reduced quantized frequency-domain data to obtain a bit-reduced time-domain PCM data; and performing a bit addition on the bit-reduced time-domain PCM data according to the adjusting factor to obtain a time-domain PCM data.

An inverse quantization processing device is further provided according to another aspect of the present invention. The inverse quantization processing device applied to a decoder comprises a determining unit, a bit reduction unit, a frequency/time domain conversion unit and a bit addition unit. The determining unit receives a plurality of quantized frequency-domain data and generates a determining signal when an accumulated count value of valid bit numbers of the plurality of quantized frequency-domain data greater than a first threshold reaches a second threshold. The bit reduction unit, coupled to the determining unit, performs a bit reduction on a quantized frequency-domain data by utilizing an adjusting factor according to the determining signal, so as to output a bit-reduced quantized frequency-domain data. The frequency/time domain conversion unit, connected to the bit reduction unit, receives the bit-reduced quantized frequency-domain data outputted by the bit reduction and performs a frequency/time domain conversion, so as to generate a bit-reduced time-domain PCM data. The bit addition unit, signally connect to the frequency/time-domain conversion unit, performs a bit addition on the bit-reduced time-domain PCM data according to the adjusting factor, so as to obtain a time-domain PCM data.

According to the foregoing structure, the decoder applied to the inverse quantized processing method and device according to the present invention is a DSP.

According to the foregoing structure, the determining unit applied to the inverse quantized processing method and device according to the present invention further comprises a valid bit detector, a counter, a first comparator and a second comparator. The valid bit detector detects each quantized frequency-domain data from the most significant bit (MSB) towards the least significant bit (LSB) for the first non-zero bit to determine bit numbers of the first non-zero bits of each quantized frequency-domain data as valid bit numbers. The counter generates an accumulated count value. The first comparator, coupled to the valid bit detector and the counter, triggers the counter to add 1 to the accumulated count value when each valid bit number is greater than the first threshold value, and triggers the counter to reduce 1 from the accumulated count value when each valid bit number is smaller than or equal to the first threshold. The second comparator coupled to the counter and the valid bit detector signals the valid bit detector to transmit the plurality of quantized frequency-domain data having greater valid bit numbers than the first threshold to the bit reduction unit when the count value reaches the second threshold.

According to the foregoing structure, the first threshold applied in the inverse quantization processing method and device according to the present invention is a maximum code length supported by the frequency/time-domain unit.

According to the foregoing structure, the adjusting factor applied to the inverse quantization processing method and device according to the present invention is a constant value, which is a difference d between a code length of the quantized frequency-domain data and the first threshold. The bit reduction performed by the bit reduction unit divides the plurality of quantized frequency-domain data by the n-th power of 2 to obtain the bit-reduced quantized frequency-domain data.

According to the foregoing structure, the bit addition performed by the bit addition unit applied to the inverse quantization processing method and device according to the present invention multiplies the bit-reduced time-domain PCM data with the n-th power of 2 to obtain the time-domain PCM data.

According to the foregoing structure, a saturation processing unit is further applied to the inverse quantization processing method and device according to the present invention. The saturation processing unit, coupled between the determining unit and the frequency/time domain conversion unit, performs a saturation process on each quantized frequency-domain data having the valid bit numbers greater than the first threshold when the accumulated count value is less than the second threshold, so as to remove most significant d bits of the plurality of quantized frequency-domain data.

According to the foregoing structures, the adjusting factor applied to the inverse quantization processing method and device according to the present invention is a variable, which is a difference z by subtracting the first threshold from each valid bit number. The bit reduction performed by the bit reduction unit moves a window having a bit length of the first threshold z bits from a least significant bit (LSB) towards an MSB, so as to obtain the bit-reduced quantized frequency-domain data in the window.

According to the foregoing structure, the bit addition unit applied to the inverse quantization processing method and device according to the present invention multiplies the bit-reduced time-domain PCM data with the z-th power of 2 to obtain the time-domain PCM data.

According to the foregoing structure, the frequency/time domain conversion unit applied to the inverse quantization processing method and device according to the present invention is an inverse Fourier transform device.

BRIEF DESCRIPTION OF THE DRAWINGS

Following description and figures are disclosed to have a better understanding of the advantages of the present invention.

DETAILED DESCRIPTION OF THE PREFERRED EMBODIMENT

Figure 1:
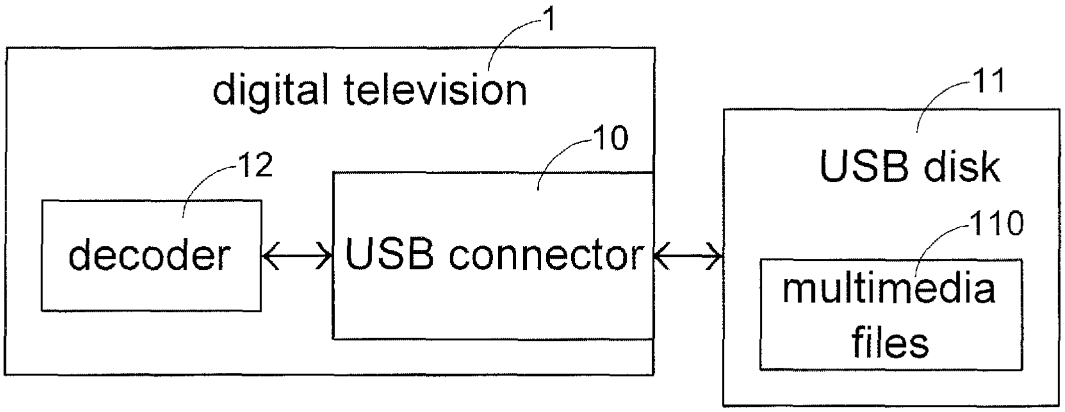
FIG. 1 (Prior Art)
FIG. 1 is a block diagram of connecting a DTV to a USB disk via a USB connector in accordance with an embodiment of the present invention.
Figure 2:
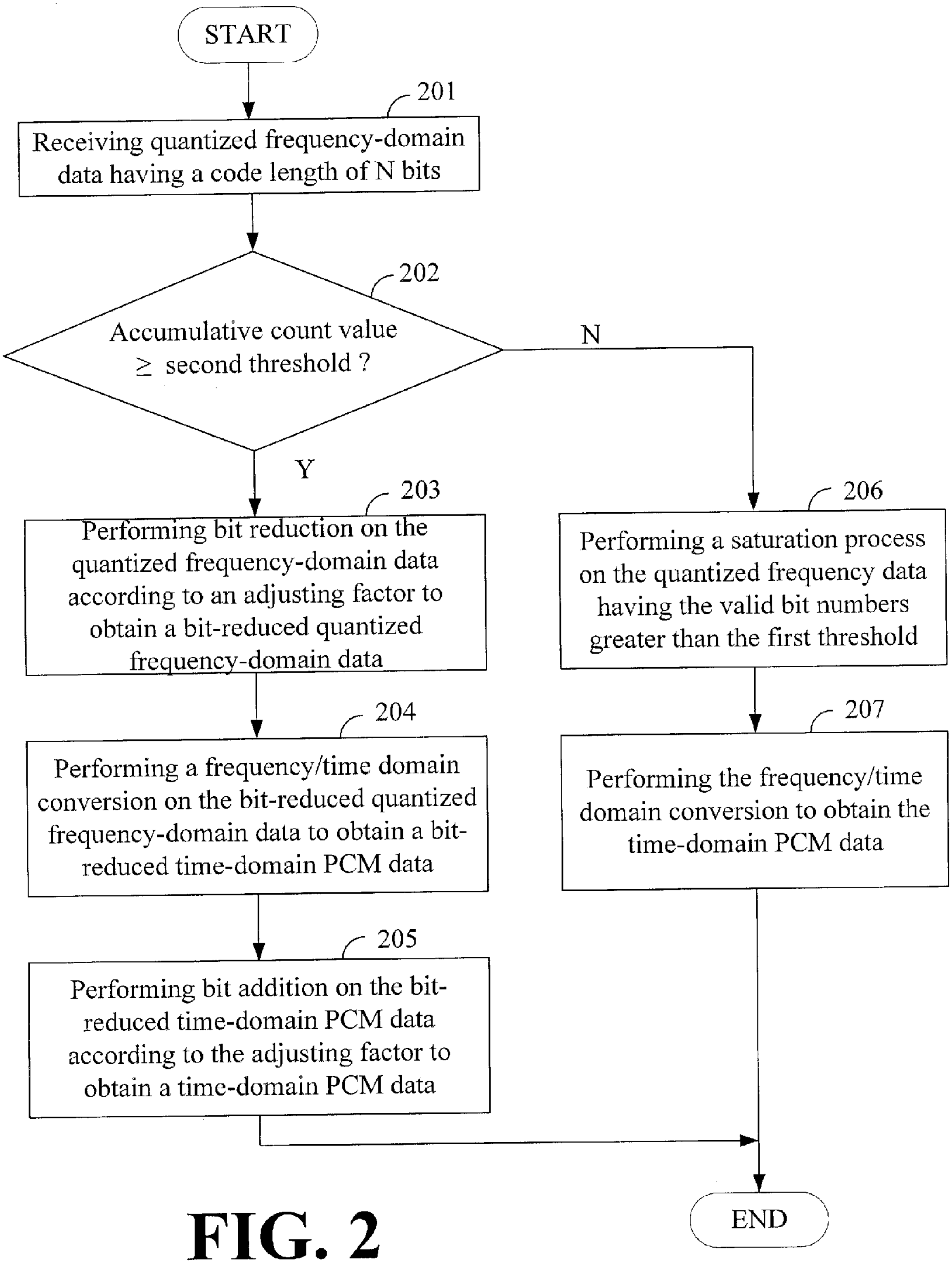
FIG. 2 is a flowchart of an inverse quantization method in accordance with an embodiment of the present invention for overcoming disadvantages of the prior art.

Refer to FIG. 2 showing a flowchart of an inverse quantization method in accordance with an embodiment of the present invention. The inverse quantization method is applied to a decoder, e.g. a digital signal processor (DSP). In this embodiment, a conversion from a quantized frequency-domain data to a quantized PCM data is improved. In Step 201, a plurality of quantized frequency-domain data having a code length of N bits are consecutively received. In Step 202, it is determined that, among the quantized frequency-domain data, whether an accumulative count value of valid bit numbers greater than a first threshold reaches a second threshold. When the answer of Step 202 is positive, the flowchart branches to Step 203. In Step 203, bit reduction is performed on the quantized frequency-domain data according to an adjusting factor to obtain a bit-reduced quantized frequency-domain data. In Step 204, a frequency/time domain conversion is performed on the bit-reduced quantized frequency-domain data to obtain a bit-reduced time-domain PCM data. In Step 205, bit addition is performed on the bit-reduced time-domain PCM data according to the adjusting factor to obtain a time-domain PCM data. In addition, in Step S206, among the quantized frequency-domain data, when the accumulative count value of the valid bit numbers greater than the first threshold does not reach the second threshold, a saturation process is performed on the quantized frequency data having the valid bit numbers greater than the first threshold. In Step S207, the frequency/time domain conversion is performed to obtain the time-domain PCM data. Accordingly, a problem that a PCM signal is distorted in the time domain is effectively solved.

For example, when N is equal to 32, a quantized frequency-domain data having a code length of 32 bits enters a decoder. A valid bit number of the quantized frequency-domain data is first determined. That is, the quantized frequency-domain data is searched from its most-significant bit (MSB) towards its least-significant-bit (LSB) for a first non-zero bit, and a bit number of the first non-zero bit of the quantized frequency-domain data is determined as the valid bit number. For example, for a 32-bit quantized frequency-domain data 00000000010010000010000000000010, the valid bit number is 23. For another 32-bit quantized frequency-domain data 00100000010010000010000000000010, the valid bit number is 30. The first threshold is a maximum code length, e.g., 24, supported by the frequency/time domain conversion. Therefore, when the valid bit number is greater than the first threshold, the quantized frequency-domain data over-flows so that a count value representing the accumulated count value is added by 1. Otherwise, when the valid bit number is smaller than or equal to the first threshold, the quantized frequency-domain data does not over-flow so that the count value is reduced by 1.

Figure 3:
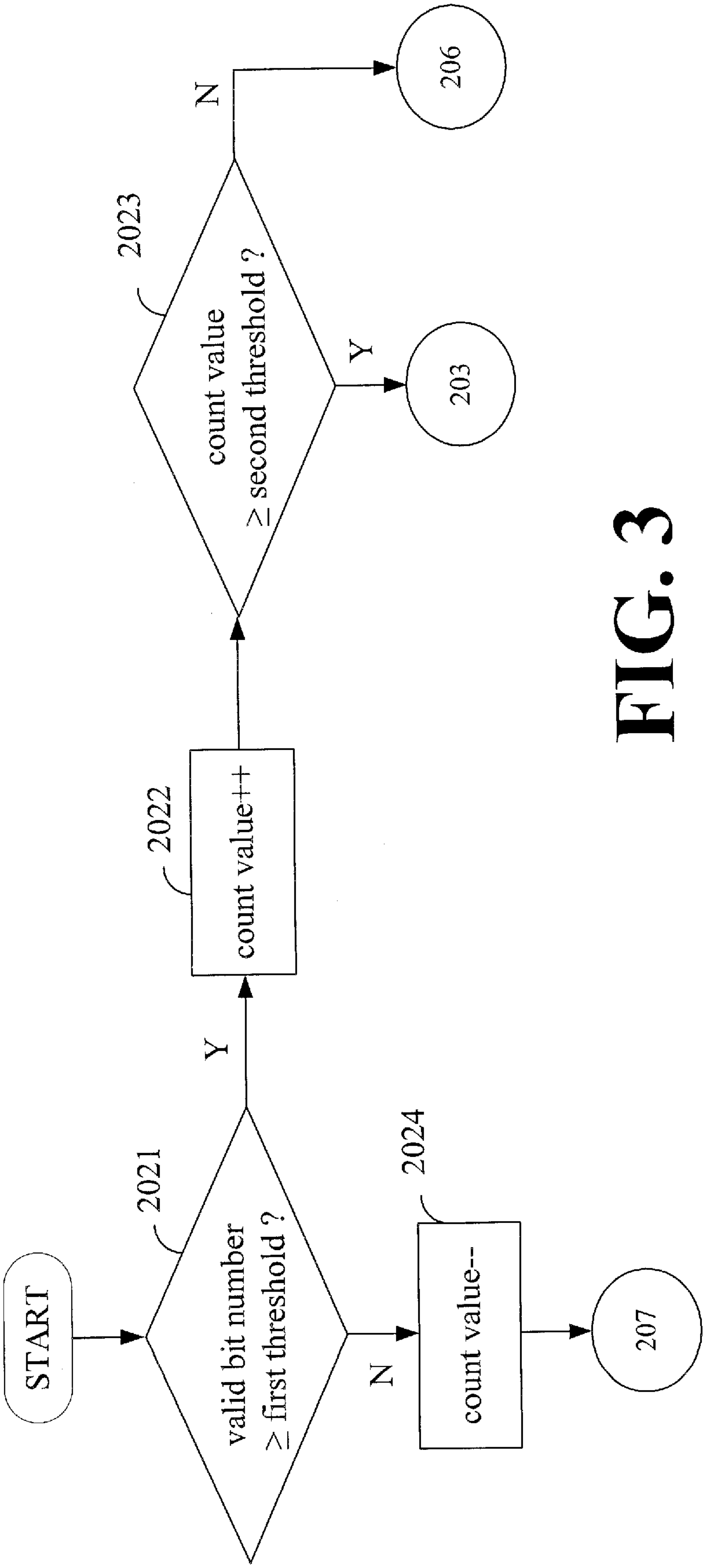
FIG. 3 is a flowchart in accordance with a preferred embodiment of the present invention.

FIG. 3 shows a detailed flowchart of Step 202 in FIG. 2 in accordance with a preferred embodiment of the present invention. In Step 2021, whether the valid bit number is greater than the first threshold is determined. When the answer of Step 2021 is positive, the flowchart branches to Step 2022. Otherwise, Step 2024 is performed. In Step 2022, the count value is added by 1. In Step 2024, the count value is reduced by 1, and Step 207 is performed. In Step 207, the frequency/time domain conversion is directly performed on the quantized frequency-domain data. In addition, after Step 2022, Step 2023 is performed. In Step 2023, whether the accumulated count value reaches the second threshold is determined. When the answer of Step 2023 is positive, Step 203 is performed; otherwise, Step 206 is performed.

The adjusting factor of Step 203 is denoted by a constant value d. Preferably, d represents a difference between the code length N and the first threshold. Taking the foregoing values in the previous embodiment for example, d is equal to 8, which is obtained by subtracting 24 from 32. The bit reduction divides the quantized frequency-domain data by the d-th power of 2, so as to generate the bit-reduced quantized frequency-domain data. Taking the foregoing values for example, the quantized frequency-domain data 00100000010010000001000000000010 is reduced to 00000000001000000100100000010000. That is, the least significant 8 bits of the quantized frequency-domain data are removed to generate the bit-reduced quantized frequency-domain data. In Step 204, the frequency/time domain conversion is performed on the bit-reduced quantized frequency-domain data to generate a bit-reduced time-domain PCM data. For example, the frequency/time domain conversion is an inverse Fourier transform. According to linearity of the Fourier transform, Step 205 is performed. That is, in Step 205, bit addition is performed on the bit-reduced time-domain PCM data according to the adjusting factor, so as to generate the time-domain PCM data. In this embodiment, the bit addition multiplies the bit-reduced time-domain PCM data with the d-th power of 2, so as to obtain the time-domain PCM data.

In another embodiment, the adjusting factor of Step 203 is defined as a variable, which represents a difference z generated by subtracting the first threshold from the valid bit number of the quantized frequency-domain data. Taking the foregoing 32-bit data 00100000010010000001000000000010 for example, the valid bit number is 30 and the first threshold is 24 so that the difference z is 6. Therefore, the bit reduction is to move a 24-bit window for 6 bits from the right side to the left side. The 24-bit window is moved from 00100000010010000001000000000010 to 00100000010010000001000000000010, so as to obtain the bit-reduced quantized frequency-domain data 100000010010000001000000. In Step 204, the frequency/time domain conversion is performed on the bit-reduced quantized frequency-domain data to obtain a bit-reduced quantized time-domain PCM data. For example, the frequency/time domain conversion is an inverse Fourier transform. According to linearity of the Fourier transform, Step 205 is performed. That is, in Step 205, bit addition is performed on the bit-reduced time-domain PCM data according to the adjusting factor to generate the time-domain PCM data. In this embodiment, the bit addition multiplies the bit-reduced time-domain PCM data with the z-th power of 2, so as to obtain the time-domain PCM data.

For example, in Step 206, the saturation process removes the 8 MSBs of the quantized frequency-domain data, so as to obtain a 24-bit quantized frequency-domain data.

Figure 4:
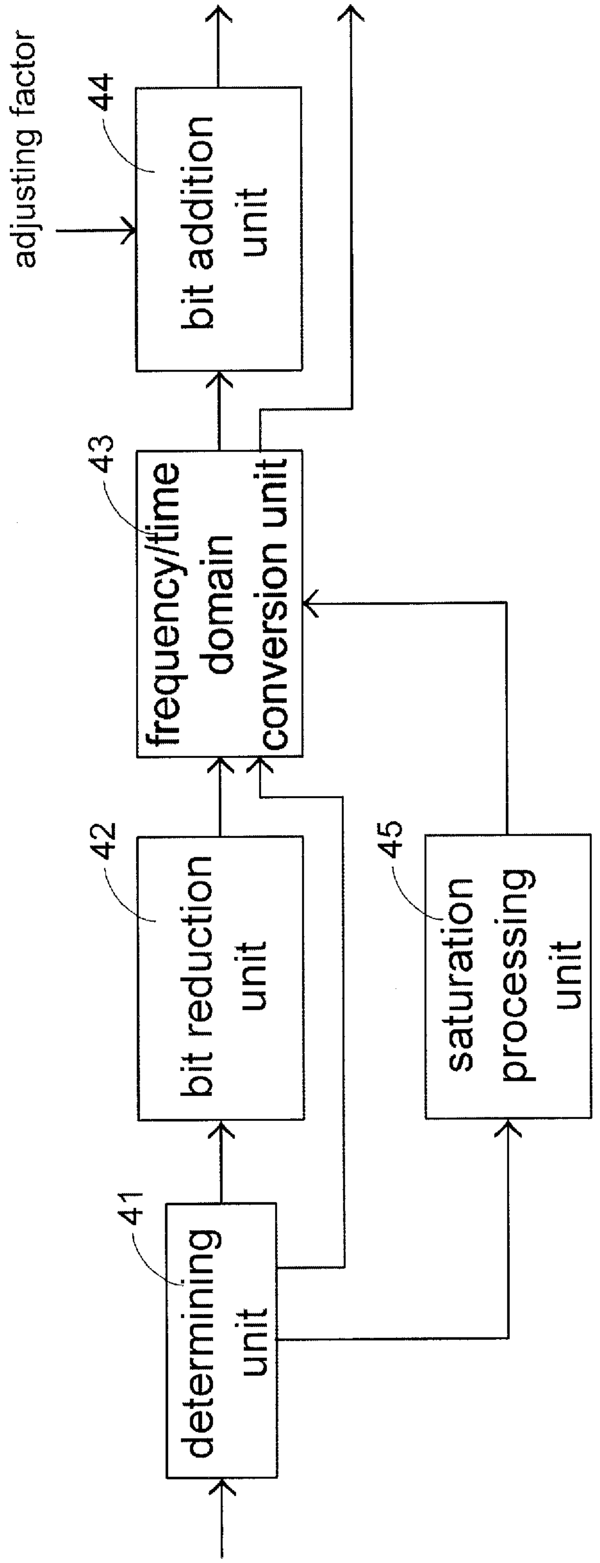
FIG. 4 is a block diagram of an inverse quantization processing device in accordance with another preferred embodiment of the present invention.

FIG. 4 is a block diagram of an inverse quantization processing device in accordance with a preferred embodiment of the present invention. The inverse quantization processing device applied to a decoder converts a quantized frequency-domain data to time-domain PCM data. A determining unit 41 consecutively receives a plurality of quantized frequency-domain having a code length of N bits, determines among the quantized frequency-domain data whether valid bit numbers are greater than a first threshold, and determines whether an accumulative count value of the valid bit numbers greater than the first threshold reaches a second threshold. When the accumulative count value of the valid bit numbers greater than the first threshold reaches the second threshold, the determining unit 41 generates a determining signal and transmits the quantized frequency data to a bit reduction unit 42. The bit reduction unit 42 performs a bit reduction process on the quantized frequency-domain data to obtain a bit-reduced quantized frequency-domain data according to an adjusting factor generated according to the determining signal, and transmits the bit reduction quantized frequency-domain data to a frequency/time domain conversion unit 43. The frequency/time domain conversion unit 43 performs a frequency/time domain conversion on the bit reduced quantized frequency-domain data to obtain a bit-reduced time-domain PCM data to be transmitted to a bit addition unit 44. The bit addition unit 44 performs a bit addition on the bit-reduced time-domain PCM data according to the adjusting factor to obtain a time-domain PCM data. When the accumulated count value reaches the second threshold, the quantized frequency-domain data having the valid bit numbers greater than the first threshold are transmitted to a saturation processing unit 45 for a saturation process. The bit reduction, the frequency/time domain conversion and the bit addition is the same as those described in the above inverse quantization method.

Figure 5:
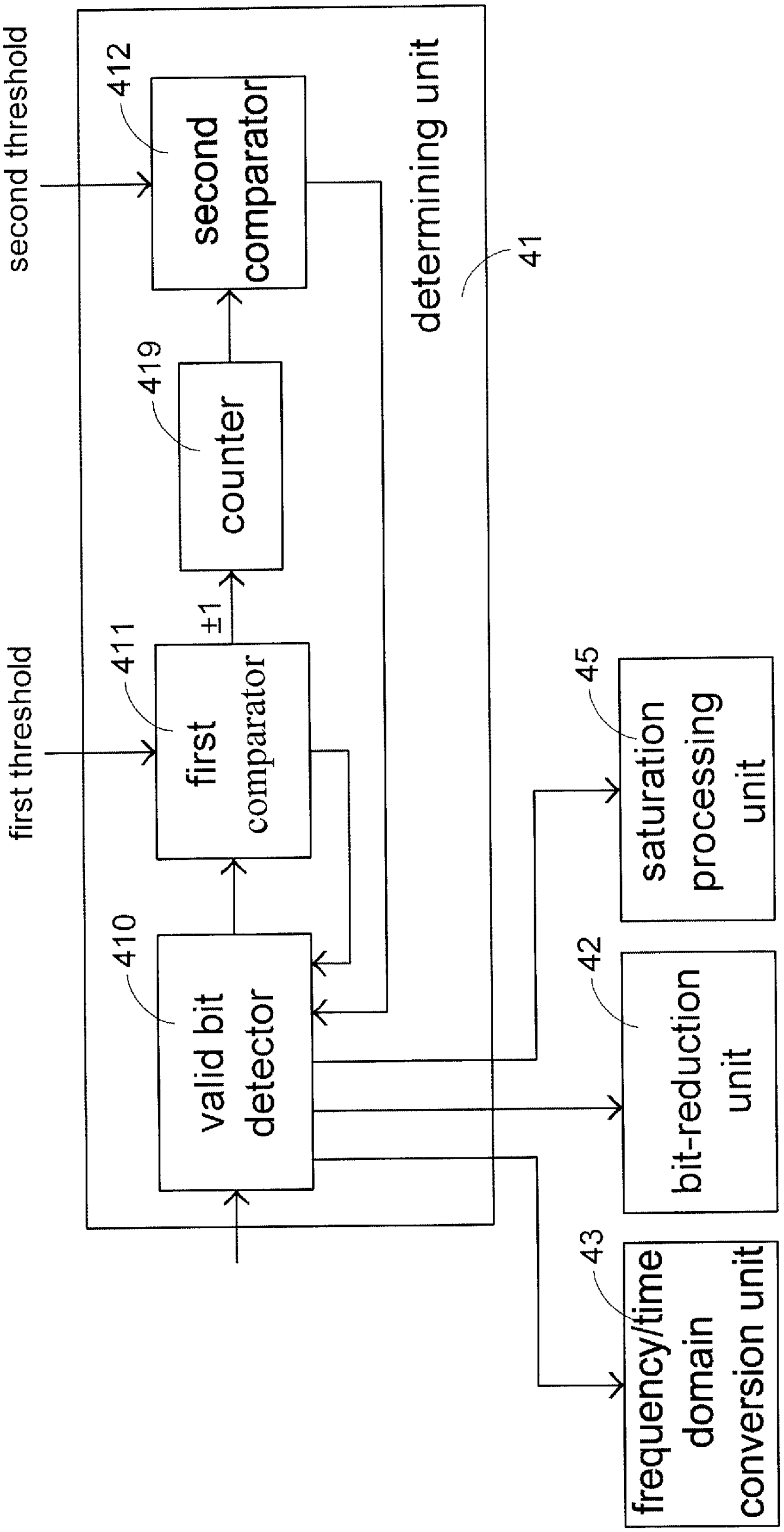
FIG. 5 is a block diagram of a determining unit in accordance with another embodiment of the present invention.

Refer to FIG. 5 showing a block diagram of a determining unit 41 in accordance with a preferred embodiment of the present invention. A valid bit detector 410 determines valid bit numbers of the quantized frequency-domain data. The valid bit detector searches the quantized frequency-domain data from the MSB to determine a bit number of a first non-zero bit of the quantized frequency-domain data as the valid bit number. A first comparator 411 determines whether the valid bit number of the quantized frequency-domain data is greater than a first threshold. When the valid bit number of the quantized frequency-domain data is not greater than the first threshold, a counter 419 subtracts 1 from an accumulated count value, and the valid bit detector 410 transmits the quantized frequency-domain data to a frequency/time domain conversion unit 43 for a frequency/time domain conversion. When the valid bit number of the quantized frequency-domain data is greater than the first threshold, the counter 419 adds 1 to the accumulated count value, and a second comparator 412 determines whether the accumulated count value reaches a second threshold. When the accumulated count value reaches the second threshold, the quantized frequency-domain data having the valid bit numbers greater than the first threshold are transmitted to a saturation processing unit 45 for a saturation process. The frequency/time domain conversion unit 43 performs inverse Fourier transformation, e.g. an inverse modified discrete cosine transformation (IMDCT).

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An inverse quantization processing method, applied to a decoder, comprising:

receiving a plurality of quantized frequency-domain data;

performing a bit reduction on a current quantized frequency-domain data of the plurality of the quantized frequency-domain data according to an adjusting factor when, among the plurality of the quantized frequency-domain data, an accumulated count value of a plurality of valid bit numbers greater than a first threshold reaches a second threshold, to generate a bit-reduced quantized frequency-domain data, wherein the adjustment factor is an integer, and each valid bit number represents a bit number of a first non-zero bit of the corresponding quantized frequency-domain data;

performing a frequency/time domain conversion on the bit-reduced quantized frequency-domain data to generate a bit-reduced time-domain pulse code modulation (PCM) data; and performing a bit addition on the bit-reduced time-domain PCM data according to the adjusting factor to generate a time-domain PCM data.

2. The inverse quantization processing method as claimed in claim 1, wherein the decoder is a digital signal processor (DSP).

3. The inverse quantization processing method as claimed in claim 1, wherein each valid bit number represents a bit number of a first non-zero bit of each quantized frequency-domain data by searching from a most significant bit (MSB) towards a least significant bit (LSB).

4. The inverse quantization processing method as claimed in claim 1, wherein the accumulated count value is added by 1 when the valid bit number is greater than the first threshold, and the accumulated count value is reduced by 1 when each valid bit number is smaller than or equal to the first threshold.

5. The inverse quantization processing method as claimed in claim 1, wherein the first threshold is a maximum code length supported by the frequency/time domain conversion performed by the decoder.

6. The inverse quantization processing method as claimed in claim 1, wherein the adjusting factor is a constant value, which is a difference d between a code length of the current quantized frequency-domain data and the first threshold, and the bit reduction divides the current quantized frequency-domain data by the d-th power of 2 to obtain the bit-reduced quantized frequency-domain data.

7. The inverse quantization processing method as claimed in claim 1, wherein the bit addition multiplies the bit-reduced time-domain PCM data with the d-th power of 2 to obtain the time-domain PCM data.

8. The inverse quantization processing method as claimed in claim 6, wherein when the count value is less than the second threshold, a saturation process is performed on the plurality of quantized frequency-domain data having the valid bit numbers greater than the first threshold, so as to remove d MSBs of the plurality of quantized frequency-domain data.

9. The inverse quantization processing method as claimed in claim 6, wherein the adjusting factor is a variable, which is a difference z generated by subtracting the first threshold from the valid bit number of the current quantized frequency-domain data, and the bit reduction moves a window having a bit length of the first threshold z bits from an LSB to an MSB, so that the bit-reduced quantized frequency-domain data is obtained through the window.

10. The inverse quantization processing method as claimed in claim 9, the bit addition multiplies the bit-reduced time-domain PCM data with the z-th power of 2 to obtain the time-domain PCM data.

11. An inverse quantization processing device, applied to a decoder, comprising:

a determining unit, consecutively receiving a plurality of quantized frequency-domain data, for generating a determining signal when, among the quantized frequency-domain data, an accumulated count value of a plurality of valid bit numbers greater than a second threshold reaches a second threshold, wherein the adjustment factor is an integer, and each valid bit number represents a bit number of a first non-zero bit of the corresponding quantized frequency-domain data;

a bit reduction unit, coupled to the determining unit, for performing a bit reduction on a current quantized frequency-domain data of the quantized frequency-domain data utilizing an adjusting factor according to the determining signal to output a bit-reduced quantized frequency-domain data;

a frequency/time domain conversion unit, coupled to the bit reduction unit, for receiving the bit-reduced quantized frequency-domain data outputted by the bit reduction unit and performing a frequency/time domain conversion to obtain a bit-reduced time-domain PCM data; and a bit addition unit, coupled to the frequency/time domain conversion unit, for performing a bit addition on the bit-reduced time-domain PCM data to obtain a time-domain PCM data.

12. The inverse quantization processing device as claimed in claim 11, wherein the decoder is a digital signal processor (DSP).

13. The inverse quantization processing device as claimed in claim 11, wherein the determining unit comprises:

a valid bit detector, for detecting each quantized frequency-domain data from an MSB towards an LSB for a first non-zero bit to determine the valid bit numbers;

a counter, for generating the count value;

a first comparator, coupled to the valid bit detector and the counter, for triggering the counter to add 1 to the count value when each valid bit number is greater than the first threshold, and for triggering the counter to subtract 1 from the count value when each valid bit number is smaller than or equal to the first threshold; and a second comparator, coupled to the counter and the valid bit detector, for signaling the valid bit detector to transmit the quantized frequency-domain data to the bit reduction unit when the count value reaches a second threshold.

14. The inverse quantization processing device as claimed in claim 11, wherein the first threshold is a maximum code length supported by the frequency/time domain conversion unit.

15. The inverse quantization processing device as claimed in claim 11, wherein the adjusting factor is a constant value, which is a difference d between a code length of the quantized frequency-domain data and the first threshold, and the bit reduction performed by the bit reduction unit divides the quantized frequency-domain data by the d-th power of 2 to obtain the bit-reduced frequency-domain data.

16. The inverse quantization processing device as claimed in claim 15, wherein the bit addition performed by the bit addition unit multiplies the bit-reduced time-domain PCM data with the d-th power of 2 to obtain the time-domain PCM data.

17. The inverse quantization processing device as claimed in claim 15, further comprising a saturation processing unit coupled between the determining unit and the frequency/time-domain conversion unit, wherein the saturation processing unit performs a saturation process on the plurality of quantized frequency-domain data having the valid bit numbers greater than the first threshold, so as to remove most significant d bits of the quantized frequency-domain data.

18. The inverse quantization processing device as claimed in claim 11, wherein the adjusting factor is a variable, which is a difference z by subtracting the first threshold from the valid bit number of the quantized frequency-domain data, and the bit reduction performed by the bit reduction unit moves a window having a bit length of the first threshold z bits from an LSB to an MSB, so that the bit-reduced quantized frequency-domain data is obtained through the window.

19. The inverse quantization processing device as claimed in claim 18, wherein the bit addition performed by the bit addition unit multiplies the bit-reduced time-domain PCM data with the z-th power of 2 to obtain the time-domain PCM data.

20. The inverse quantization processing device as claimed in claim 11, wherein the frequency/time domain conversion unit is an inverse Fourier conversion device.

* * * * *